Dec. 1, 1959    J. R. SALERNO    2,915,219
FEED MECHANISM FOR CONTAINERS
Filed March 15, 1955    4 Sheets-Sheet 1
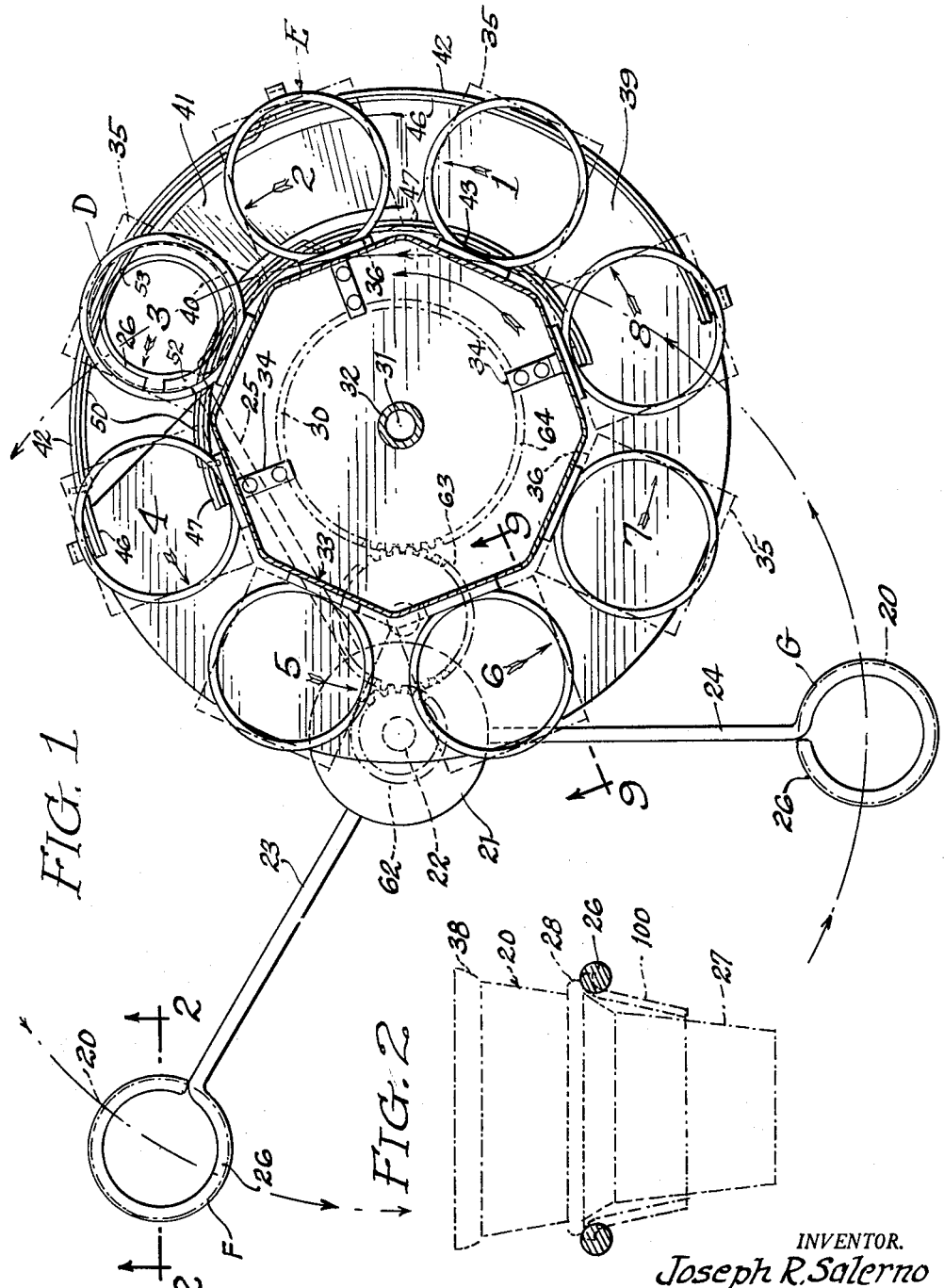
INVENTOR.
Joseph R. Salerno
BY
Cone, McDougall
Williams & Kersh
Attorneys

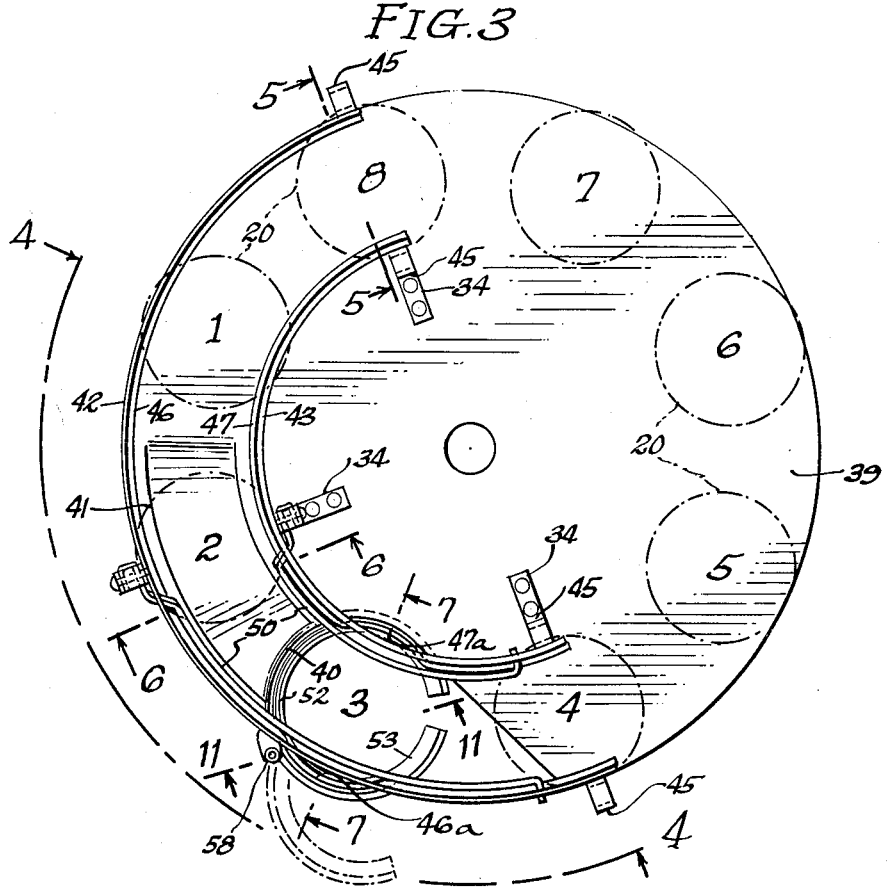

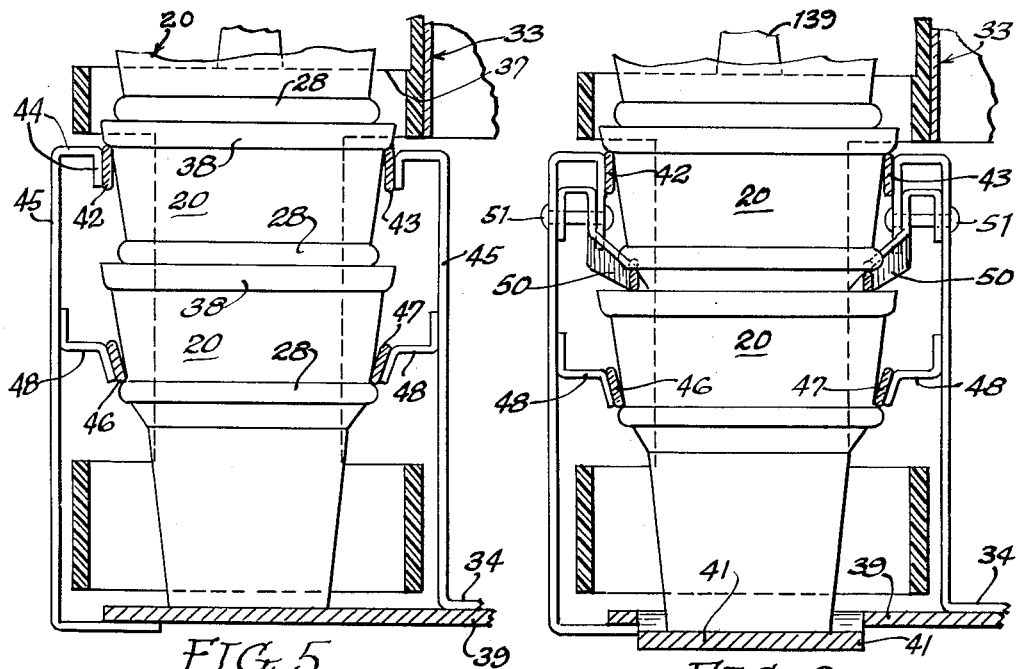
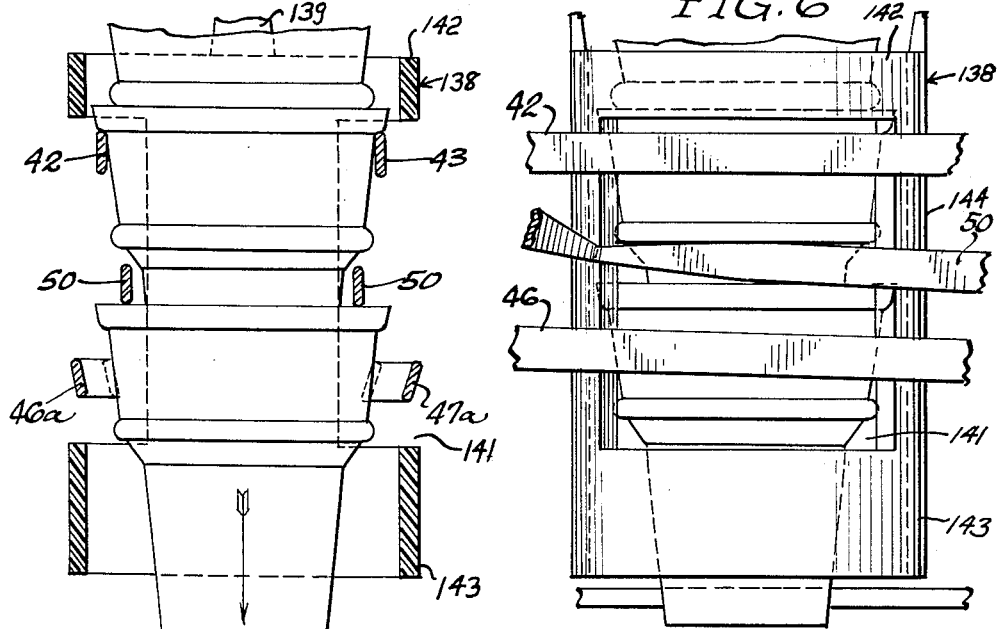

Dec. 1, 1959    J. R. SALERNO    2,915,219
FEED MECHANISM FOR CONTAINERS
Filed March 15, 1955    4 Sheets-Sheet 4

INVENTOR.
Joseph R. Salerno
BY
Osma, McDougall,
Williams & Hersh
Attorneys

United States Patent Office

2,915,219
Patented Dec. 1, 1959

2,915,219

FEED MECHANISM FOR CONTAINERS

Joseph R. Salerno, Chicago, Ill.

Application March 15, 1955, Serial No. 494,451

6 Claims. (Cl. 221—113)

This invention relates to a vending machine and to parts thereof and it relates more particularly to a feed mechanism in a vending machine of the type described for removing a container from a supply source and advancing the container to position of use for receiving material to be dispensed therein during a normal cycle of operation of the vending machine.

More specifically, this invention relates to mechanism for the separation of baked cones from a supply source in which a large number of such cones or containers are stacked for advancement separately to a predetermined position for receiving ice cream or the like frozen confection or material delivered by a machine from a bulk container or the like. The feed mechanism forming the subject matter of this invention is particularly adapted for use in an ice cream cone vending machine of the type described in the copending applications, Ser. No. 81,120, filed March 12, 1949, now Patent No. 2,728,306, and Ser. No. 112,725, filed August 27, 1949, now Patent No. 2,716,385, but it will be understood that a feed mechanism embodying the features of this invention is applicable as well for use in other machines which make use of a cone, dish or similar container for dispensing ice cream, ice cream sundaes, ice cream sodas, other frozen confections and the like materials which are adapted to be dispensed in such containers.

In the aforementioned copending applications, description is made of an ice cream cone vending machine in which a cylinder of ice cream, such as a 5-gallon drum, is mounted within a refrigerated space in a vending machine on a platform having a tubular member extending downwardly from an opening in the central portion of the platform in communication with an opening in the bottom wall of the cylinder through which ice cream or other material of similar consistency is extruded from the cylinder into a scoop of semi-cylindrical shape mounted for rotational movement in the end of the tubular member.

A ram dimensioned to operate through the open end at the top of the cylinder functions automatically, as will hereinafter be described, to place the ice cream within the cylinder under pressure for extrusion thereof through the openings in the bottom wall into the tubular member for filling the scoop. As indicated in the copending applications, it is preferred to effect the operations for filling the scoop during the end portion of the cycle of operation so that the machine will be poised to deliver a ball of ice cream or the like during the initial portion of the next cycle.

During the next cycle of operation, the scoop filled with ice cream is rotated by a hollow shaft from the upright position to an inverted position during which it cuts into the section of ice cream filling the tube to form a substantially perfect ball. The scoop dwells in the inverted position long enough for an arcuate cutting blade mounted on the end of a shaft within the hollow shaft to reciprocate back and forth over the inner wall of the scoop to separate the ball of ice cream whereby it is able to fall by gravity into a container or cone previously positioned therebeneath for receiving the ball of ice cream as it drops. Upon completion of the operation of the cutter blade, the hollow shaft is returned to its original position for locating the scoop upright in the end of the tubular member and then the driving means for the ram is initiated to cause downward displacement of the ram into the cylinder of ice cream for extrusion of ice cream until the scoop is filled. As the scoop becomes filled, the pressure conditions existing causes displacement of the scoop and the shafts upon which it is mounted for rocking movement about a lateral support. Responsive to such rocking movement, the power source is reversed for a short time to raise the ram a distance sufficient to relieve the pressure on the ice cream within the cylinder. Thus the dispensing portion of the machine is carried through a complete cycle of operation.

It is an object of this invention to provide a feed mechanism for operation in timed relation, with the dispensing mechanism to pre-position a container, such as a cone, by removal from a source of supply and delivery thereof in separated relation to a position for receiving the ball of ice cream or the like as it is dropped from the scoop during its dwell in the inverted position.

More specifically, it is an object to provide a feed mechanism for removing one cone at a time from a supply source in which a plurality of such cones are stacked and for advancing said cones in their separated relation without breakage to a position for receiving the material to be dispensed and which embodies safety features to prevent operation of the dispensing means in the absence of a container in position of use for receiving the material and for indicating when no further containers are present in the supply source; which continues to operate so long as a cone or container is available in the supply source until a cone is advanced in position of use for receiving material during the dispensing operation; which is constructed of relatively few simple parts that are easily assembled into a sturdy device; which handles the containers gently during advancement into position of use, and which guides the containers during advancement properly to separate the containers and accurately to position the containers beneath the scoop for receiving the ball of ice cream which is released therefrom.

These and other objects and advantages of this invention will hereinafter appear and for purposes of illustration, but not of limitation, an embodiment of the invention is shown in the accompanying drawings in which:

Figure 1 is a top plan view of the delivery mechanism for ice cream cones embodying features of this invention;

Figure 2 is a sectional view taken along the line 2—2 of Figure 1;

Figure 3 is a top plan view of the dispensing mechanism shown in Figure 1 with portions omitted for purposes of illustrating the arrangement of the cones and parts during passage through the machine;

Figure 4 is an elevational view showing a development of the principal portion of the dispensing mechanism shown in Figure 3 taken from beneath the lines 4—4 of Figure 3;

Figure 5 is a sectional view taken along the line 5—5 of Figure 3;

Figure 6 is a sectional elevational view taken along the line 6—6 of Figure 3;

Figure 7 is a sectional elevational view taken along the line 7—7 of Figure 3;

Figure 8 is a side elevational view of the arrangement of parts in position 3 of Figure 3;

Figure 9:
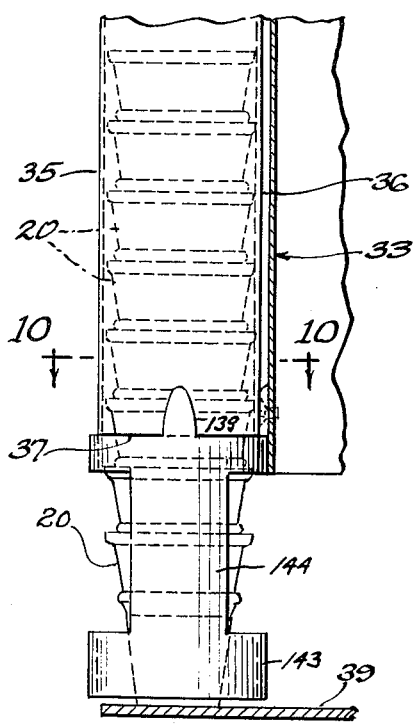
Figure 9 is a sectional view taken along the line 9—9 of Figure 1.
Figure 10:
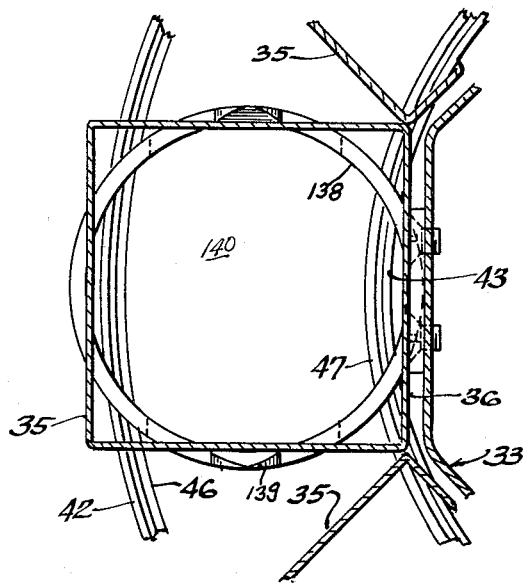
Figure 10 is a sectional view taken along the line 10—10 of Figure 9.

In the drawings, the containers illustrated as cones 20 for use in receiving the ball of ice cream released from the dispenser are carried from one position to another by a spider having a center hub 21 rotatable about a vertical axis 22 and having elongate arms 23, 24 and 25 extending radially therefrom with a ring 26 on the end of each arm dimensioned to enable the lower end portion 27 of the cone to pass therethrough until the lower annual flange 28 in the upper end portion of the cone comes to rest on the ring 26 for supporting the cone in upright position.

In each of its positions of movement, the spider is adapted to have one arm with the ring in position D to receive an empty cone from the cone dispenser indicated generally by the letter E while another arm 23 with an empty cone therein is positioned in position F beneath the scoop from which the ball of ice cream is dropped into the waiting container while still a third arm 24 holds a cone filled with a ball of ice cream in delivery position G in the forward portion of the housing which is accessible from the outside for removal of the cone.

The cone dispensing means E constituting the subject matter of this invention comprises a ring gear 30 which is mounted for rotational movement about a vertical axis 31 with a shaft 32 that is connected for turning movement conjointly with the spider 21 but for an amount limited to turn the ring 30 a fraction of a circle corresponding to the number of stacks of cones carried in equidistantly spaced apart relation about the ring while the spider swings about its axis a fraction of a circle corresponding to the number of arms extending outwardly therefrom.

A housing 33 of polygonal shape is fixed to the shaft 32 for rotational movement therewith. The number of sides of the polygonal housing is adapted to correspond with the number of cycles of the machine required to make a complete revolution. In the illustrated modification, the housing 33 is formed with eight side walls uniformly spaced about the axis to receive a carton, said carton being formed with eight separate compartments 35 joined along adjacent inner edges one to another to enable the carton to be formed with inner walls 36 defining a casing of octagonal shape dimensioned to fit in sliding relation about the housing 33 with the bottom end 37 resting upon the upper edge of tubular members 138 formed of plastic, metal or other rigid material having a lip 139 extending upwardly from the leading and trailing upper edges of each member for engaging the outer wall of the cartons 35 properly to align the compartments with the openings 140 in the tubular members. The openings are dimensioned to enable the cones or containers to move easily downwardly therethrough. The tubular members or casings extend downwardly to within a short distance of a stationary, horizontally disposed table 39 and are dimensioned to have a length corresponding to two or three cones in stacked relation.

Each compartment 35 of the carton or container is adapted to house a stack of cones in interfitting relation in which the cones are preferably formed with an annular flange 38 about the upper edge portion and another annular flange 28 preferably in the upper half of the cone but in spaced relation from the upper flange. The stacks of cones and the compartments 35 are dimensioned to permit relatively free sliding movement of the stack through the compartment and the aligned tubular members 138 so that the cones will normally shift downwardly as far as possible in response to gravitational force which plays an important part in the operation of the described feed mechanism.

When in position of use, the compartments of the carton and the aligned casings are located directly over the stationary table 39 in circumferentially spaced apart relation so that gravitational force operates to displace the stack of cones downwardly through the compartments until the cones come to rest upon the surface of the table, as illustrated in Figures 4 and 5.

The table is formed with a smooth upper surface to enable sliding movement of the cones thereover during relative rotational movement in a cycle of operation of the machine. At the feed portion the table is formed with a circular opening 40 dimensioned to enable passage of the cone while in substantially upright position downwardly therethrough and a portion of the table in advance of the opening has a central portion 41 formed to extend downwardly gradually from the surface of the table to the opening 40 to enable the cone to be lowered gradually in feeding relation. The downwardly extending runway 41 is dimensioned to have a width slightly greater than the diameter of the cone at its base so as to enable the cone to follow the runway in feeding relation. For some three or four positions in advance of the drop opening 40, and for about two positions beyond the drop opening, means are provided on the table for engaging the flange 38 of the next to the bottom cone in each stack for supporting same during passage through the area to prevent downward displacement while other means are provided in the section in advance of the cone drop for displacing the lowermost cone downwardly for separation thereof from the remainder while the remainder is independently supported as described thereby to advance the separated lowermost cone to the cone drop while the remainder of the cones in the stack are held up until the stack has been rotated for advancement beyond the drop opening. Upon release of the stack by the supporting means, the stack then drops down until it comes to rest on the surface of the table so that the cone which before was next to the bottom now becomes the bottommost cone for dispensing operations as illustrated in Figure 4 of the drawing.

The mechanism by which these operations are effected comprises upper rails 42 and 43 on both sides of the table spaced one from another by amount corresponding to the distance between the walls of the cone immediately below the annular flange 38 but less than the distance between the flanged portions and spaced from the table by an amount slightly less than the distance between the flanged portion 38 of the next to the bottom cone in the stack and the top surface of the table so that the rails 42 and 43 will be positioned immediately below the flanged portion 38 of the cone next to the bottom as the stack of cones is rotated into and through the area defined by the rails. Thus the rails which are rigidly secured to flanges 44 depending in inwardly spaced relation from uprights 45 rigid with the table 39 will prevent downward displacement of the cones above the lowermost until the stack has been displaced beyond the rails whereupon the cones become free to drop by gravity to the table.

Below the upper rails 42 and 43 there is provided a pair of lower rails 46 and 47 rigidly secured by brackets 48 to the uprights 45 upon which the upper rails 42 and 43 are mounted. The lower rails are arranged in parallel relation and spaced apart by an amount corresponding to the wall to wall dimension of the lowermost cone immediately above the lower annular flange 28 but less than the dimension of the flanged portion 28 and the rails are spaced from the surface of the table 39 by a distance slightly greater than the height of the lower flange 28 from the table whereby the lower rails 46 and 47 extend in the area between the lower and upper flanges 28 and 38 of the lowermost cone during passage of the cones between the rails in advance of the cone drop. Beginning at the point of decline of the runway portion 41, upon which the lowermost cone rests, the lower rails turn downwardly at a corresponding decline to permit the lowermost cone to follow the runway to the cone drop. In the event that the cone remains stuck to the one above in the stack, the lower rails 46 and 47 function gradually to engage the annular flange 28 positively but smoothly to effect the desired downward displacement of the lowermost cone from the stack.

A pair of elongate lever arms 50 extend horizontally in laterally spaced apart relation between the upper and lower rails and are pivotally mounted at 51 upon uprights 45 for rocking movement between a normal lowered position and a raised position of adjustment. The lever arms are spaced apart laterally by an amount less than the dimension of the flanged portion 38 but greater than the body portion of the cones adjacent thereto. In normal position, the portion of the lever arms nearest the pivot is in position to be received between the upper rim 38 of the lowermost cone and the lower flange 28 of the next cone so that, as the cone is advanced forwardly by the carriage, the lever arms become engaged by the rim 38 of the lowermost cone for rocking movement thereof towards its raised position wherein the lever arm functions in response to gravitational force constantly to push down on the lowermost cone to urge the cone downwardly from the stack, as illustrated in Figure 6 of the drawings.

To enable operative engagement between the rails and the corresponding side wall portions of the cones in the stack, the side wall portions of the tubular members 138 are cut away, as illustrated by the numeral 141. The upper edge portion 142 of the casing above the pair of upper rails 42 and 43 and the lower end portion 143 of the casing below the lowermost pair of rails 46 and 47 and the lower edge portion of the tubular member is located above the surface of the table 39. The upper portion 142 and the lower portion 143 are joined by intermediate sections 144 which operate as pushers for the cones contained therein.

The opening 40 in the table 39 at the cone drop is dimensioned to be sufficiently greater than the maximum dimension of the cone or container to permit easy passage of the cone therethrough while in an upright position. In the same location, the lower rails 46 and 47 are bowed outwardly at 46a and 47a to provide a spaced relation therebetween which releases the annular flange 28 and permits the cone freely to drop from between the rails through the cone drop opening 40 into the receiving ring 26 of the spider awaiting in registry with the drop opening 40. Displacement of the cone from the stack, initiated by the contour of the engaging rails 46 and 47, is completed upon release of the cone between rails in the region of the cone drop by the operation of the push down levers 50, as illustrated by the broken lines in Figure 4 of the drawings.

Figure 11:
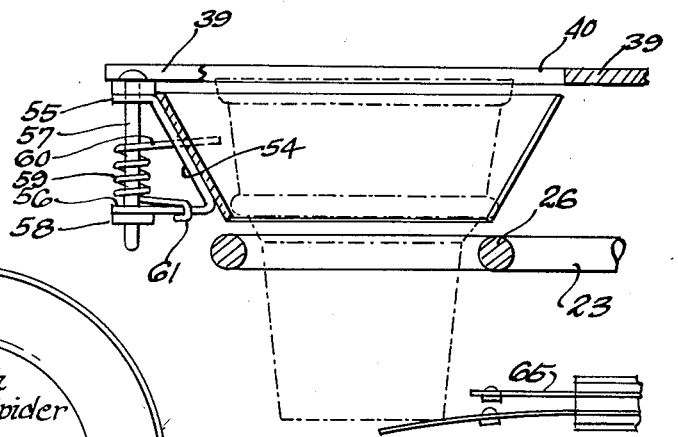
Figure 11 is a sectional view taken along the line 11—11 of Figure 3.
Figure 12:
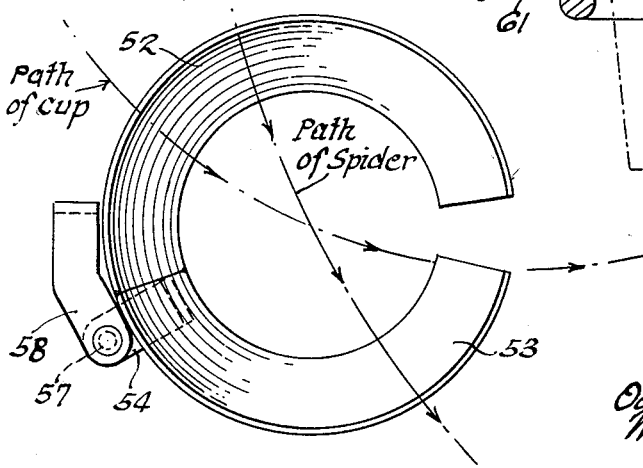
Figure 12 is a top plan view of the funnel member employed in the cone delivery opening illustrated in Figure 4 of the drawings.

Fixed as by means of a bracket 51a to the bottom side of the table in registry with the opening 40 is a funnel shaped member 52 having its upper end portion terminating immediately below the surface of the table while the lower end is slightly above the ring 26 on the end of the spider arm 25 when in position to receive the cone and the funnel is formed with an inwardly and downwardly extending taper to provide an opening in the bottom dimensioned to be slightly less than the dimension of the lowermost flange 28 of the cone so as to engage the flange for holding the cone in upright position with the lower end portion of the cone extending through the ring and with the upper edge portion of the cone located just below the level of the table, as shown in Figure 11 of the drawings.

The greater portion of the funnel 52 is rigid with the bottom of the table while a section 53 of the funnel confronting the displacement of the cone by the spider is fixed to an arm 54 having vertically spaced apart horizontally disposed flange portions 55 and 56 pivoted for rotational movement on a post 57 extending downwardly through openings in a supporting bracket 58 which is rigid with the underside of the table 39. The gateway portion 53 of the funnel 52 is contantly urged towards its closed or funnel position by means of a coil spring 59 through which the post 57 extends with one end portion 60 of the spring extending outwardly into engagement with the table while the other end portion 61 is hooked about the bracket 54 for urging same to swing in the counter-clockwise direction about its pivot.

In the illustrated modification shown in Figure 1, the spider for stationing the cones in various positions is formed with three arms 23, 24 and 25 having rings 26 on the ends thereof so as to position one ring in position D beneath the cone drop for receiving the cones upon delivery, another ring is located in position F at the ice cream cone filling position for receiving the ball of ice cream that is dropped from the dispenser, while the third ring is in the ice cream cone delivery position G adjacent the access opening to the machine for removal of the filled ice cream cone. The hub 21 of the spider has a gear 62 rigid therewith in meshing engagement with another gear 63 that interconnects a gear 64 rigid with the ring 30 to the spider gear 62 for effecting rotational movement of the latter responsive to and concurrently with rotational movement of the housing 33 as effected by a driving motor, not shown.

In operation, the elements are arranged at the start in the position shown in Figure 1 with an empty cone in the ring in position F for receiving the ball of ice cream, with an empty cone also in the funnel 52 with a portion thereof extending through the ring. As illustrated in Figure 1, the ring in the cone delivery position G is empty because the filled ice cream cone previously has been removed from the machine by the operator. In a cycle of operation, the ice cream cone dispensing mechanism is the first to operate by inverting the scoop filled with ice cream followed by reciprocation of the cutter blade while the scoop is in inverted position to free the ball of ice cream which falls by gravity into the open end of the cone supported by the spider in position F therebeneath. When the scoop returns to upright position and the motor operates to bring down the ram for extrusion of ice cream to again fill the cone, the ring 30 and its housing 33 is rotated through one-eighth of a turn in normal operation. During such rotational movement, the spider is driven through the described intermeshing gears to effect rotation about its axis for one-third of a circle thereby to displace the cone filled with ice cream from position F to position G while the ring having the empty cone is displaced from position D to position F for receiving the next ball of ice cream dropped during the next cycle of operation and the empty ring at position G is displaced into position D beneath the cone drop to receive a new cone supplied by the dispenser.

In the meantime, upon rotational movement of the housing 33, the cones are advanced one position so that the cone in position 7 is advanced into position 8 between the rails for engagement thereby. Similarly, the cone in position 1 is advanced between the rails to position 2 and so on. During such movement of the cone from position 1 to position 2, the lowermost cone is displaced downwardly away from the next which is supported on the upper rails 42 and 43 by reason of the drop in the runway 41 upon which the lowermost cone rests and by assistance from the corresponding drop in the lower rails 46 and 47 which engages the lower flange 28 of the cone and causes downward displacement thereof, as illustrated in Figure 6. In the meantime, the lowermost cone in the stack in position 2 is displaced to position 3. During this movement the cone is further displaced gradually downwardly between rails 46 and 47 by amounts permitted by the runway 41 until the cone is in registry with the cone drop opening 40 in position 3. At this point, the cone is assisted by the push down levers 50 for displacement from the stack whereby the lowermost cone falls downwardly from the stack between the lowermost rails 46 and 47 through the opening 40 into the funnel 52 and the funnel functions in cooperation with the elements described to guide the cone in an upright position in which position it is received and supported upon engagement between the lower flange 28 and the lower edge portion of the funnel 52 with the lower end portion of the cone 27 extending downwardly through the ring 26, as illustrated in Figure 7 and in Figure 11. Because of the gradual displacement and control in the movement of the cone, the latter is delivered in a proper position to be received by the funnel for holding the cone in an upright position for delivery to the spider carrier.

The upper rails 42 and 43 operate during movement of the cones from position 1 to position 4 to support the stack of cones other than the lowermost cone within the compartments since the upper flange 38 of the cone next to the bottom rides upon these rails. Thus as the lowermost cone drops from the stack in position 3 through the opening 40 in the table, the bottom of the stack of cones that remain is held in suspension by the rails above the table until the stack is advanced during normal operation beyond position 4. At this point the rails terminate so that the cones are no longer carried thereby. As a result, the entire stack is released to enable the stack to be lowered the short distance until the bottom of the lowermost cone comes to rest on the table, thus becoming the bottommost cone for displacement in the subsequent dispensing operations in the manner described.

In practice, means such as a switch arm 65 for operation of a solenoid (not shown) is positioned in the path of the cone beneath the cone drop for actuation thereof upon passages of a cone through the drop into the funnel whereby operation of the housing in rotational movement is discontinued. Such switch means constitutes a precautionary means which causes rotational movement of the housing to continue until a cone is delivered to the funnel or until all of the cones have been dispensed from the supply source.

By way of modification, the supporting rings may be formed with depending side walls 100 to form a conical section of funnel shape dimensioned to engage an intermediate portion of the side walls of the cones or containers properly to support the containers in upright position within the holder. When such means are employed, it is possible to eliminate the funnel section on the underside of the housing about the feed opening.

It will be understood that numerous changes may be made in the details of construction, arrangement and operation of the described dispensing device without departing from the spirit of the invention, especially as defined in the following claims.

I claim:

1. In a dispenser for the downward feed of tapered nestable containers each of which is formed with a bead extending outwardly from an upper portion thereof, the combination comprising a table, a plurality of magazines movable over said table for holding the stacks of nested containers with the lowermost container in each stack slidable along the table in a predetermined path, a delivery opening in the table in the path of movement of the stacks dimensioned to enable passage of the containers downwardly therethrough, a first pair of laterally spaced apart rails disposed above said table and substantially parallel thereto and extending from a short distance in advance of said delivery opening to a short distance beyond said delivery opening, said first rails being spaced apart by an amount corresponding to the diameter of said containers immediately below the bead and being disposed on opposite sides of the path of said containers over said table for movement of the containers therebetween, said first rails being spaced above said table by an amount corresponding to the elevation of the bead on the next to the lowermost container in each of said stacks for supporting the next to the lowermost container against downward movement, a second pair of opposed rails disposed above the table on opposite sides of the path of the containers and spaced apart by a distance less than the diameter of the bead on the containers and extending from a short distance in advance of the delivery opening to a short distance beyond the delivery opening, said second set of rails being positioned above the bead on the lowermost container in the stack through an initial portion of its length with an intermediate section in advance of the opening being inclined downwardly gradually to engage the underlying bead and effect downward displacement of the lowermost container in the stack as the stack is advanced towards the delivery opening to separate the lowermost container from the stack for displacement downwardly through the opening.

2. In a dispenser for downward feeding of tapered nestable containers each of which is formed with an annular bead extending outwardly from an upper portion thereof, the combination comprising a table, a plurality of magazines movable in a predetermined path over said table for holding stacks of the nested containers with the lowermost container in each stack slidable along said table, a delivery opening in the table in the path of movement of the stacks and dimensioned to enable passage of the containers downwardly therethrough, said table having a ramp portion immediately in advance of said delivery opening and sloping downwardly thereto, a first pair of opposite rail means disposed above said table substantially parallel thereto and extending from a short distance in advance of the delivery opening to a short distance beyond the delivery opening, said first rail means being spaced apart by an amount corresponding to the diameter of each of said containers immediately below said bead and being disposed on opposite sides of the path of said container over said table for movement of said containers therebetween, said first rail means being spaced above said table by an amount corresponding to the elevation of the underside of the bead on the next to the lowermost container in each of said stack for supporting the next to lowermost container against downward movement, a second pair of opposed rails spaced above said table beneath the first set of rails and on opposite sides of said path by an amount corresponding to the diameter of each container at a point immediately above the bead, said second rails having leading end portions at an elevation corresponding to the level of the upper side of the bead on each of the lowermost containers in the stack and being inclined downwardly in an intermediate section immediately in advance of the delivery opening in substantial parallel relation to the corresponding ramp portion on the table for separating the lowermost containers from each stack, said second rail being clear of the lowermost containers when said lowermost container is above the delivery opening to release the lowermost container for downward movement through the delivery opening.

3. In a dispenser for downward feeding of tapered nestable containers having uppermost and lowermost rims, the combination comprising a table, a plurality of magazines movable along a predetermined path over said table for holding and carrying stacks of the nested containers with the lowermost container in each stack movable along said table, a delivery opening in said table along said path for receiving and passing the lowermost container from each successive stack, said table having a ramp portion immediately in advance of said delivery opening and sloping downwardly thereto, a first pair of opposite rail means disposed above said table along a portion of the length of said path and substantially parallel to the table, said first rail means being spaced apart by an amount corresponding to the diameter of each container immediately below said uppermost rim and being disposed on opposite sides of said path of said containers for movement of the containers therebetween, said first rail means being spaced above the table by an amount corresponding to the elevation of the underside of the uppermost rim on the next to the lowermost container in each of said stacks for supporting the next to the lowermost container against downward movement, a second pair of opposed rail means located beneath a portion of the first rail means and disposed above said table on opposite sides of the path of the containers and spaced apart by a distance less than the diameter of the uppermost rim of each container, said second rail means being disposed generally in overlying relation to said delivery opening, means pivotally supporting said second rail means for vertical swinging movement about an axis adjacent the leading ends of said second rail means, said second rail means having a first position with said second rail means inclined downwardly between their leading and trailing ends and with the leading end portions of said second rail means disposed generally at the level of the upper side of the uppermost rim on each lowermost container for engagement thereby, said second rail means being mounted for free swinging movement into engagement with the uppermost rim of the lowermost container to urge the lowermost container through the delivery opening, and a third pair of opposed rail means spaced apart above said table and beneath said second rail means on opposite sides of said path by an amount corresponding to the diameter of each container at a point immediately above the lowermost rim, said third rail means having leading end portions at an elevation corresponding to the level of the upper side of the lowermost rim on each lowermost container, said third rail means being inclined downwardly in an intermediate section immediately in advance of the delivery opening and being generally parallel to said ramp portion on said table for separating the lowermost containers from each stack, said third rail means being clear of the lowermost container at the delivery opening to release the lowermost container for downward movement through the delivery opening.

4. In a dispenser for feeding downwardly tapered nestable containers each of which is formed with an enlarged laterally extending bead in the upper portion thereof, the combination comprising a table, a plurality of magazines movable over said table for holding stacks of the nested containers with the lowermost container in each stack slidable along said table in a predetermined path, a delivery opening in the table in the path of movement of the stacks and dimensioned to enable passage of the containers downwardly therethrough, a first pair of opposed rails being disposed above said table along a portion of the length of the path of travel of the containers over the table and substantially parallel thereto and extending from a short distance in advance of the delivery opening to a short distance beyond the delivery opening, said first rail means being spaced apart by an amount corresponding to the diameter of each of said containers immediately below said bead and being disposed on opposite sides of the path of said containers over said table for movement of the containers therebetween, said first rail means being spaced above said table by an amount corresponding to the elevation of the underside of the bead on the second to the lowermost container in each of said stacks for supporting the second to the lowermost container against downward movement, said table having a delivery opening therein along the path of said containers for receiving and passing the lowermost container from each successive stack, a second pair of opposed rail means spaced apart above said table and beneath the first rail means on opposite sides of said path by an amount corresponding to the diameter of each container at a point immediately above the bead, said second rail means having a leading end portion at an elevation corresponding to the level of the upper side of the bead on the lowermost container in the stack, said second rail means being inclined downwardly in an intermediate section immediately in advance of the delivery opening for separating the lowermost container from each stack as the stack is advanced along the path toward the delivery opening to release the lowermost container for downward movement through the opening, a carrier having holder means for receiving said containers from said delivery opening, said holder means being movable laterally into and out of a position under said delivery opening, and funnel means under said delivery opening for guiding said containers into said carrier, said funnel means having a gate portion swingable outwardly in the direction of movement of said carrier for releasing each container for movement away from said delivery opening by said carrier, and yieldable means biasing said gate portion inwardly for returning said gate portion to its closed position.

5. In a dispenser for feeding downwardly tapered nestable containers having an uppermost rim and a lowermost rim projecting outwardly from the side walls thereof, the combination comprising a table, a plurality of magazines movable along a predetermined path over said table for holding and carrying stacks of the nested containers with the lowermost container in each stack movable along said table, a delivery opening in said table along said path for receiving and passing the lowermost container from each successive stack, said table having a ramp portion immediately in advance of said delivery opening and sloping downwardly thereto, a first pair of opposite rail means disposed above said table along a portion of the length of said path and substantially parallel thereto, said first rail means being spaced apart by an amount corresponding to the diameter of each container immediately below said uppermost rim and being disposed on opposite sides of said path of said containers for movement of the containers therebetween, said first rail means being spaced above said table by an amount corresponding to the elevation of the underside of the uppermost rim on the second to the lowermost container in each of said stacks for supporting the second to the lowermost container against downward movement, a second pair of opposed rail means located beneath a portion of the first rail means and disposed above said table on opposite sides of the path of the containers and spaced apart by a distance less than the diameter of the uppermost rim on each container, said second rail means being disposed generally in overlying relation to said delivery opening, means pivotally supporting said second rail means for vertical swinging movement about an axis adjacent the leading ends of said second rail means, said second rail means having a first position with said second rail means inclined downwardly between their leading and trailing ends and with the leading end portions of said second rail means disposed generally at the level of the upper side of the uppermost rim on each lowermost container for engagement thereby, said second rail means being swingable upwardly from said first position by the lowermost containers and being operative to swing downwardly by their own weight to push each lowermost container through the delivery opening, and a third pair of opposed rail means spaced apart above said table and beneath the second rail means on opposite sides of said path by an amount corresponding to the diameter of each container at a point immediately above said lowermost rim, said third rail means having leading end portions at an elevation corresponding to the level of the upper side of the lowermost rim on each lowermost container, said third rail means being inclined downwardly in an intermediate section immediately in advance of the delivery opening and being generally parallel to said ramp portion on said table for separating the lowermost containers from each stack, said third rail means being clear of the lowermost container at the delivery opening to release the lowermost container for downward movement through the delivery opening, a carrier having holder means for receiving said containers from said delivery opening, said holder means being movable into and out of a position under said delivery opening, and funnel means under said delivery opening for guiding said containers into said carrier, said funnel means having a gate portion swingable outwardly in the direction of movement of said carrier for releasing each container for movement away from said delivery opening by said carrier, and yieldable means biasing said gate portion inwardly for returning said gate portion to its closed position.

6. In a dispenser for feeding downwardly tapered nestable containers each of which is formed with an enlarged bead extending laterally from an upper portion thereof, the combination comprising a table, a plurality of magazines movable over said table for holding stacks of nested containers with the lowermost container in each stack slidable along said table, a first pair of opposite rail means disposed above said table along a portion of the length of the path of travel of the containers over the table and substantially parallel thereto, said first rail means being spaced apart by an amount corresponding to the diameter of each of said containers immediately below said enlarged bead and being disposed on opposite sides of the path of said containers over said table for movement of the containers therebetween, said first rail means being spaced above said table by an amount corresponding to the elevation of the underside of the enlarged bead on the second to the lowermost container in each of said stacks for supporting the second to the lowermost container against downward movement, said table having a delivery opening therein along the path of said containers for receiving and passing the lowermost container from each successive stack, a second pair of rails spaced apart above the table and beneath the first pair of rails by an amount corresponding to the diameter of each container at a point immediately above the enlarged bead, the second pair of rails having a leading end portion at an elevation corresponding to the level of the upper side of the enlarged bead of the lowermost container in the stack, said second pair of rails being inclined downwardly in an intermediate section immediately in advance of the delivery opening whereby the lowermost container in the stack is displaced downwardly from the stack as the stack is advanced to the delivery opening to release the lowermost container for downward movement through the opening, and a carrier having holder means movable into and out of a position under said delivery opening for receiving and carrying away each successive container, said holder means having funnel means thereon for guiding each container and maintaining the container in an upright position.

References Cited in the file of this patent

UNITED STATES PATENTS

| | | |
|---|---|---|
| 2,524,673 | Martin | Oct. 3, 1950 |
| 2,556,852 | Pickering | June 12, 1951 |
| 2,559,063 | Bremer | July 3, 1951 |
| 2,580,257 | Tacchella | Dec. 25, 1951 |
| 2,602,556 | Sheehan | July 8, 1952 |